No. 615,726. Patented Dec. 13, 1898.
J. A. LYTLE.
COMBINATION AGRICULTURAL IMPLEMENT.
(Application filed Aug. 12, 1897.)
(No Model.)
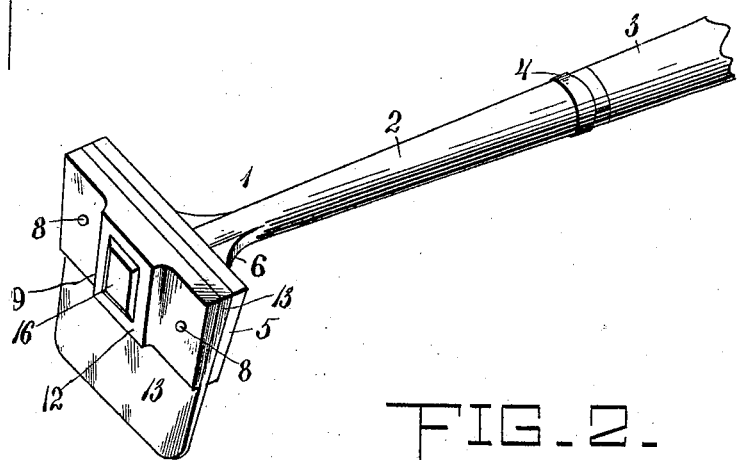
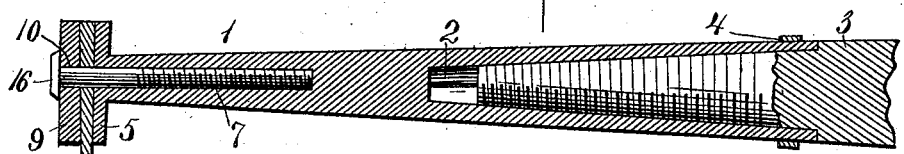
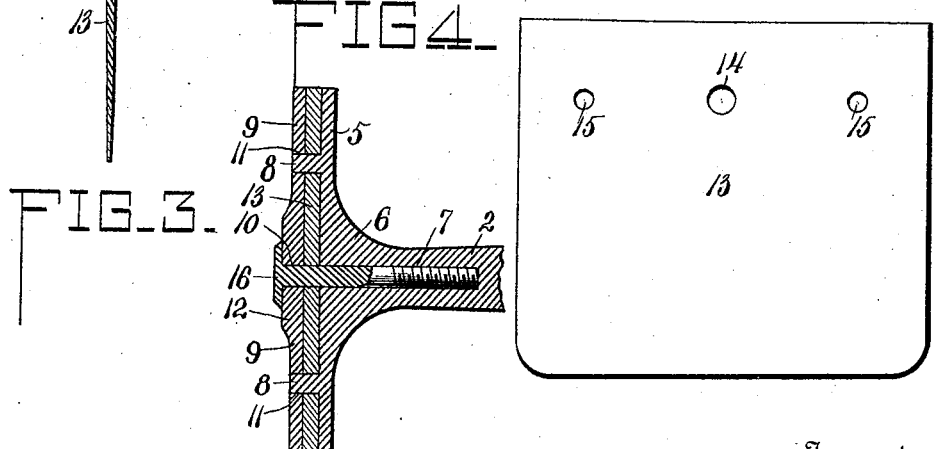
Witnesses
W. E. Allen
Victor J. Evans
Inventor
John A. Lytle
By John Wedderburn
Attorney
THE NORRIS PETERS CO., PHOTO-LITHO., WASHINGTON, D. C.

UNITED STATES PATENT OFFICE.

JOHN A. LYTLE, OF GLENVILLE, WEST VIRGINIA.

COMBINATION AGRICULTURAL IMPLEMENT.

SPECIFICATION forming part of Letters Patent No. 615,726, dated December 13, 1898.

Application filed August 12, 1897. Serial No. 648,025. (No model.)

*To all whom it may concern:*

Be it known that I, JOHN A. LYTLE, of Glenville, in the county of Gilmer and State of West Virginia, have invented certain new and useful Improvements in Combination Agricultural Implements; and I do hereby declare the following to be a full, clear, and exact description of the invention, such as will enable others skilled in the art to which it appertains to make and use the same.

This invention has reference to a novel construction in a socket-piece that is adapted more especially for agricultural implements for the purpose of permitting the various implements to be used in connection with a handle and also for the purpose of permitting the handle proper to be changed, although it is understood that the invention can be used in other instances as found convenient and desirable.

The invention consists in the features of construction hereinafter described and specifically claimed.

In the accompanying drawings, forming a part of this specification, Figure 1 is a perspective view of the invention and showing a hoe-blade held thereby. Fig. 2 is a longitudinal section of the same. Fig. 3 is a transverse section of the clamp-head. Fig. 4 is a plan view of the hoe-blade.

It is understood, of course, that other implements can be used in connection with the socket-piece, although a hoe-blade is selected for the purpose of illustration, and when other implements are employed their upper ends are constructed in the same manner as the hoe-blade—namely, with the central opening and two smaller openings on each side thereof. The socket-piece is indicated as a whole by 1, and comprises a ferrule 2 at the rear end thereof that is screw-threaded interiorly and which is also split longitudinally, whereby it can be wedged tightly upon the end of the handle 3 by means of the ring 4. The other end of the socket-piece is provided with a plate extending to one side thereof, the plane of the plate 5 being situated approximately at right angles to the length of the socket-piece, while the plate is braced to one end of the socket-piece by the rods 6. An opening 7 is made in the lower end of the socket-piece, preferably concentric therewith, and extends from the plate inwardly, as shown, and is screw-threaded. On the front face of the plate and situated on opposite sides of the opening 7 are the pins 8, that extend at right angles to the plane of said plate 5. A removable clamping-plate 9 acts in conjunction with the plate 5 and is provided with an opening 10 about midway between its ends and which corresponds with the opening 7 of the plate 5. On opposite sides of this opening 10 are two small openings 11, that are situated to receive the pins 8 of the plate 5. The portion of the plate around the opening 10 is thickened or reinforced, as shown at 12. The hoe-blade 13 is provided with a central opening 14 and the smaller openings 15 on the opposite sides thereof that correspond with the openings 10 and 11 of the plate 9, and in practice the hoe-blade is placed upon the plate 5, with the pins 8 extending through the openings 15, and then the plate 9 is placed upon the hoe-blade, with the pins 8 extending through the openings 11 therein. A headed screw-threaded bolt 16 is then screwed into the opening 7 and serves to clamp the plate 9 tightly with the hoe-blade firmly held between it and the plate 5.

It is seen from the foregoing description that various agricultural implements can be substituted for hoe-blades and said parts quickly removed or replaced and, furthermore, that the handle 3 can be changed, as found convenient, by reason of the split ferrule 2 and the clamping-ring 4.

Having thus described my invention, what I claim as new, and desire to secure by Letters Patent, is—

1. A socket of the kind specified provided at one end with a ferrule to receive a handle and at its other end with a plate, an opening extending through said plate and into the socket-piece, pins projecting from the front of said plate at right angles to the plane of the plate on opposite sides of said opening, a removable plate provided with an opening to correspond with the opening of the first-mentioned plate and with openings on opposite sides thereof to receive said projecting pins, and a headed bolt adapted to extend through said openings in the plate and into the internally-threaded opening in the socket.

2. A socket of the kind specified provided with a ferrule at one end, said ferrule being screw-threaded interiorly and split longitudinally, a clamping-ring around said ferrule, a plate at the other end of said socket, a removable plate, and means for securing said movable plate against said first-mentioned plate and for firmly holding an implement between said plate.

In testimony whereof I have signed this specification in the presence of two subscribing witnesses.

JOHN A. LYTLE.

Witnesses:
A. S. McQUAIN,
J. D. JONES.